United States Patent
Benazouzz et al.

(10) Patent No.: US 6,562,924 B2
(45) Date of Patent: May 13, 2003

(54) PROCESS FOR THE GAS-PHASE (CO)-POLYMERIZATION OF OLEFINS IN A FLUIDIZED BED REACTOR

(75) Inventors: Gacem Benazouzz, Martigues (FR); Michel Camoin, Port de Bouc (FR); Laurent Coupier, Sausset les Pins (FR); Jean-Pierre Isnard, Martigues (FR); Frederic Robert Marie Michel Morterol, Sausset les Pins (FR); John Paul McNally, Simiane Collongue (FR); Renaud Viguier, Lavera (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/985,818

(22) Filed: Nov. 6, 2001

(65) Prior Publication Data

US 2002/0091208 A1 Jul. 11, 2002

Related U.S. Application Data

(63) Continuation of application No. PCT/GB00/01690, filed on May 3, 2000.

(30) Foreign Application Priority Data

May 7, 1999 (EP) .............................. 99430008

(51) Int. Cl.$^7$ ................................. C08F 2/34

(52) U.S. Cl. ................. 526/201; 526/68; 526/128; 526/159; 526/160; 526/170; 526/348.2; 526/348.5; 526/348.6; 526/88

(58) Field of Search ................. 526/68, 128, 159, 526/160, 170, 201, 348.2, 348.5, 348.6, 901, 88

(56) References Cited

U.S. PATENT DOCUMENTS

| | | | |
|---|---|---|---|
| 5,026,795 A | | 6/1991 | Hogan |
| 5,405,922 A | * | 4/1995 | DeChellis et al. ............ 526/68 |
| 6,022,935 A | * | 2/2000 | Fischer et al. ............... 526/129 |

FOREIGN PATENT DOCUMENTS

| | | |
|---|---|---|
| DE | 196 15 953 A1 | 4/1996 |
| EP | 0 453 116 A1 | 10/1991 |
| EP | 0 636 636 A1 | 1/1995 |
| EP | 0 811 638 A2 | 10/1997 |

* cited by examiner

Primary Examiner—David W. Wu
Assistant Examiner—William K Cheung
(74) Attorney, Agent, or Firm—Finnegan, Henderson, Farabow, Garrett and Dunner, L.L.P.

(57) ABSTRACT

A process for the gas-phase (co-)polymerization of olefins in a fluidized bed reactor using a metallocene catalyst in that the polymerization is preformed in the presence of a process aid additive selected from at least one of 1) a polysulfone copolymer, 2) a polymeric polyamine, or 3) an oil-soluble sulfonic acid.

11 Claims, No Drawings

PROCESS FOR THE GAS-PHASE (CO)-POLYMERIZATION OF OLEFINS IN A FLUIDIZED BED REACTOR

RELATED APPLICATIONS

This application is a continuation of international application No. PCT/GB00/01690 filed May 3, 2000.

BACKGROUND OF THE INVENTION

The present invention relates to a process for the gas-phase (co-)polymerization of olefins in a fluidized bed reactor using a metallocene catalyst.

The present invention also relates to a process for preventing fouling during the gas-phase (co-)polymerization of olefins in a fluidized bed reactor using a metallocene catalyst.

The present invention further relates to a process for improving the polymer flowability and the fluidization characteristics during the gas-phase (co-)polymerization of olefins in a fluidized bed reactor using a metallocene catalyst.

Processes for the co-polymerization of olefins in the gas phase are well known in the art. Such processes can be conducted for example by introducing the gaseous monomer and comonomer into a stirred and/or gas fluidized bed comprising polyolefin and a catalyst for the polymerization.

In the gas fluidized bed polymerization of olefins, the polymerization is conducted in a fluidized bed reactor wherein a bed of polymer particles is maintained in a fluidized state by means of an ascending gas stream comprising the gaseous reaction monomer. The start-up of such a polymerization generally employs a bed of polymer particles similar to the polymer which it is desired to manufacture. During the course of polymerization, fresh polymer is generated by the catalytic polymerization of the monomer, and polymer product is withdrawn to maintain the bed at more or less constant volume. An industrially favoured process employs a fluidization grid to distribute the fluidizing gas to the bed, and to act as a support for the bed when the supply of gas is cut off. The polymer produced is generally withdrawn from the reactor via a discharge conduit arranged in the lower portion of the reactor, near the fluidization grid. The fluidized bed consists in a bed of growing polymer particles. This bed is maintained in a fluidized condition by the continuous upward flow from the base of the reactor of a fluidizing gas.

The polymerization of olefins is an exothermic reaction and it is therefore necessary to provide means to cool the bed to remove the heat of polymerization. In the absence of such cooling the bed would increase in temperature and, for example, the catalyst becomes inactive or the bed commences to fuse. In the fluidized bed polymerization of olefins, the preferred method for removing the heat of polymerization is by supplying to the polymerization reactor a gas, the fluidizing gas, which is at a temperature lower than the desired polymerization temperature, passing the gas through the fluidized bed to conduct away the heat of polymerization, removing the gas from the reactor and cooling it by passage through an external heat exchanger, and recycling it to the bed. The temperature of the recycle gas can be adjusted in the heat exchanger to maintain the fluidized bed at the desired polymerization temperature. In this method of polymerizing alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidize the bed, and to maintain the bed at the desired temperature. Monomers consumed by the polymerization reaction are normally replaced by adding make up gas or liquid to the polymerization zone or reaction loop.

It is also well known that metallocene catalysts can advantageously be used for the (co-)polymerization of olefins. In particular, it has been reported that metallocene catalysts can now be successfully used in slurry or liquid phase polymerization process in industrial plants. This is unfortunately not the case for the gas phase process where many problems still remain. For example, metallocene catalysts have a tendency toward fouling in gas phase polymerization process. It would appear that non uniform fluidization as well as poor heat transfer in the polymerization process are more frequently encountered in gas phase when metallocene catalysts are used. An explanation might be that metallocene polymer particles have a higher tendency to adhere together or to the walls of the reactor and to continue to polymerize and often fuse together and form chunks, which can be detrimental to a continuous process, particularly a fluidized bed process. Another problem linked to the use of metallocene catalysts in a fluidized bed process lies in the very particular activity kinetic profile exhibited by this catalyst; indeed it is reported in the literature that the metallocene activity kinetic profile is responsible for most of the polymerization troubles faced when this type of catalyst is introduced into the reactor, problems even more exacerbated during the polymerization start-up. There is thus a need in the art to find a process for producing successfully polyolefins on gas phase industrial plants using a metallocene catalyst.

The Applicants have now unexpectedly found a simple and efficient process which overcomes the problems encountered with the gas phase polymerization of olefins using a metallocene catalyst.

SUMMARY OF THE INVENTION

In accordance with the present invention, there has now been found a process for the gas-phase (co-)polymerization of olefins in a fluidized bed reactor using a metallocene catalyst in the presence of a process aid additive characterised in that the additive comprises at least one of the components selected from:

(1) a polysulfone copolymer, (2) a polymeric polyamine, and (3) an oil-soluble sulfonic acid.

Preferably, the process aid additive comprises at least two components selected from above components (1), (2) and (3). More preferably, the process aid additive comprises a mixture of (1), (2) and (3).

DETAILED DESCRIPTION OF THE INVENTION

The process aid additive can be added at any location of the fluidized bed polymerization system, e.g. in the reactor itself, below the fluidization grid or above the grid in the fluidized bed, above the fluidized bed, in the powder disengagement zone of the reactor, anywhere in the reaction loop or recycle line, in the fines recycle line (when a fines separator, preferably a cyclone, is used) etc . . . According to a preferred embodiment of the present invention, the process aid additive is directly added into the fines recycle line (when a fines separator, preferably a cyclone, is used) or directly into the polymerization zone, more preferably directly into the fluidized bed, ideally into the lower part of the bed (below half bed height). For the purposes of the present invention and appended claims, the polymerization zone means the reaction zone consisting of the fluidized bed itself, and the region above the fluidized bed which consists of the powder disengagement zone and/or the velocity reduction zone. The process aid additive is preferably directly added into the fluidized bed polymerization reaction zone. It is also particularly preferred according to the present invention that the process aid additive is not added in admixture with a catalyst component like the catalyst itself or the cocatalyst. According to another preferred embodiment, the process aid additive is added into the fluidized bed polymerization system through the well known BP high productivity nozzles which protrude through the fluidization grid directly into the fluidized bed (see e.g. WO9428032, the content of which is incorporated hereby by reference).

According to the present invention, the polysulfone copolymer component of the process aid additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —$(C_xH_{2x})$—COOH wherein x is from 0 to about 17, and B is hydrogen or carboxyl, with the proviso that when B is carboxyl, x is 0, and wherein A and B together can be a dicarboxylic anhydride group.

Preferably, the polysulphone copolymer employed in the present invention has a weight average molecular weight in the range 10,000 to 1,500,000, preferably in the range 50,000 to 900,000. The units derived from the one of more 1-alkenes are preferably derived from straight chain alkenes having 6–18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid. For further details of polysulphones particularly suitable for use in the present invention reference may be made to UK patent specifications 1,432,265, 1,432,266, and U.S. Pat. Nos. 3,811,848 and 3,917,466.

A preferred polysulfone copolymer is 1-decene polysulfone having an inherent viscosity (measured as a 0.5 weight percent solution in toluene at 30° C.) ranging from about 0.04 dl/g to 1.6 dl/g.

According to the present invention, the polymeric polyamine component of the process aid additive is preferably a polymeric polyamine having the general formula:

RN[(CH$_2$CHOHCH$_2$NR$^1$)$_a$—(CH$_2$CHOHCH$_2$NR$^1$—R$^2$—NH)$_b$—(CH$_2$CHOHCH$_2$NR$^3$)$_c$H]$_x$H$_{2+x}$, wherein R$^1$ is an aliphatic hydrocarbyl group of 8 to 24 carbon atoms, R$^2$ is an alkylene group of 2 to 6 carbon atoms, R$^3$ is the group —R$^2$—HNR$^1$, R is R$^1$ or an N-aliphatic hydrocarbyl alkylene group having the formula

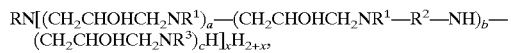

R$^1$NHR$^2$—;

a, b and c are integers of 0–20 and x is 1 or 2; with the proviso that when R is R$^1$ then a is an integer of 2 to 20 and b=c=0, and when R is R$^1$NHR$^2$— then a is 0 and b+c is an integer of 2 to 20.

The polymeric polyamines which can be suitably employed in the process of the present invention are described in U.S. Pat. No. 3,917,466, in particular at column 6 line 42 to column 9 line 29.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, eg a mixture of xylene and isopropanol, adding a strong base, eg sodium hydroxide and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo 130" sold by Universal Oil Company.

According to the present invention, the oil-soluble sulfonic acid component of the process aid additive is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

In accordance with the present invention, the process aid additive preferably comprises 1 to 25 weight percent of the polysulfone copolymer, 1 to 25 weight percent of the polymeric polyamine, 1 to 25 weight percent of the oil-soluble sulfonic acid and 25 to 95 weight percent of a solvent. Neglecting the solvent, the process aid additive preferably comprises about 5–70 weight percent polysulfone copolymer, 5–70 weight percent polymeric polyamine, and 5–70 weight percent oil-soluble sulfonic acid; the total of course being 100 percent.

Suitable solvents include aromatic, paraffin and cycloparaffin compounds. The solvents are preferably selected from among benzene, toluene, xylene, cyclohexane, fuel oil, isobutane, kerosene and mixtures thereof for instance.

According to a preferred embodiment of the present invention, the process aid additive is diluted in a conventional hydrocarbon diluent which can be the same or different than the above solvent, and which is preferably butane, pentane or hexane.

When a diluent is used, the process aid additive is preferably present in an amount comprised between 0.5 and 500 g/l of diluent, preferably between 5 and 200 g/l of diluent.

According to a preferred embodiment of the present invention, the total weight of components (1), (2), (3), the solvent and the diluent represents essentially 100% of the weight of the process aid additive.

One useful composition, for example, consists of 13.3 weight percent 1:1 copolymer of 1-decene and sulfur dioxide having an inherent viscosity of 0.05 determined as above, 13.3 weight percent of "Polyflo 130" (1:1.5 mole ratio reaction product of N-tallow-1,3-diaminopropane with epichlorohydrin), 7.4 weight percent of either dodecylbenzylsulfonic acid or dinonylnaphthylsulfonic acid, and 66 weight percent of an aromatic solvent which is preferably toluene or kerosene.

Another useful composition, for example, consists of 2 to 7 weight percent 1:1 copolymer of 1-decene and sulfur dioxide having an inherent viscosity of 0.05 determined as above, 2 to 7 weight percent of "Polyflo 130" (1:1.5 mole ratio reaction product of N-tallow-1,3-diaminopropane with epichlorohydrin), 2 to 8 weight percent of either dodecylbenzylsulfonic acid or dinonylnaphthylsulfonic acid, and 78 to 94 weight percent of an aromatic solvent which is preferably a mixture of 10 to 20 weight percent toluene and 62 to 77 weight percent kerosene.

The additive composition of the present invention (including the solvent therefor) is preferably added to the reactor in an amount ranging from about 5 to about 200 ppm, more preferably from about 10 to about 150 ppm, more preferably from about 10 to about 100 ppm, based on the weight of the olefin introduced into the reactor.

Based on the total weight of just the polysulfone polymer, polymeric amine and oil-soluble sulfonic acid, the preferred concentration of the aid additive is about 0.3 to about 70, preferably about 0.9 to about 35 parts by weight per million parts by weight of the olefin introduced into the reactor.

The process aid additive can be added continuously or intermittently to the reactor. In the continuous gas phase polymerization process according to the present invention, it is preferred to continuously add the additive to the reactor. Sufficient process aid additive is added to maintain its concentration at the desired level.

According to a preferred embodiment of the present invention, before the metallocene catalyst is introduced into the reactor, the reactor is pre-loaded with the said process aid additive. This pre-load can be done before or after the introduction of the seed bed polymer into the reactor; however, it is preferred to perform the pre-load solely on the seed bed polymer.

For the pre-load, the additive composition of the present invention (including the solvent therefor) is preferably added to the reactor in an amount ranging from about 2 to about 100 ppm, more preferably from about 5 to about 50 ppm, based on the weight of the seed polymer bed.

Based on the total weight of just the polysulfone polymer, polymeric amine and oil-soluble sulfonic acid, the preferred concentration of the aid additive is about 0.1 to about 35, preferably about 0.5 to about 20 parts by weight per million parts by weight of the seed polymer bed.

According to a preferred embodiment of the present invention, the process aid additive is a material sold by Octel under the trade name STADIS, preferably STADIS 450, more preferably STADIS 425.

In accordance with the present invention, there is also provided a process for preventing fouling during the gas-phase (co-)polymerization of olefins in a fluidized bed reactor using a metallocene catalyst in the presence of a process aid additive characterised in that the additive comprises a mixture of (1) a polysulfone copolymer,
(2) a polymeric polyamine, and
(3) an oil-soluble sulfonic acid.

In accordance with the present invention, there is further provided a process for improving the flowability of the polymer and/or the fluidization characteristics of the polymer during the gas-phase (co-)polymerization of olefins in a fluidized bed reactor using a metallocene catalyst in the presence of a process aid additive characterised in that the additive comprises a mixture of (1) a polysulfone copolymer,
(2) a polymeric polyamine, and
(3) an oil-soluble sulfonic acid.

Indeed, while not wishing to be bound to the following explanation, the Applicants believe that flowability of the polymer and/or fluidization characteristics of the polymer are highly critical for running metallocene catalysts in the gas phase polymerization of olefins. Such findings are supported in detail in the following examples.

Consequently, and as reflected in the attached examples, the present invention also relates to an ethylene (co)polymer obtainable by the process of the present invention, i.e. a gas-phase (co-)polymerization process of ethylene in a fluidized bed reactor using a metallocene catalyst in the presence of a process aid additive characterised in that the additive comprises a mixture of (1) a polysulfone copolymer,
(2) a polymeric polyamine, and
(3) an oil-soluble sulfonic acid.

The process according to the present invention is suitable for the manufacture of polymers in a continuous gas fluidized bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerization of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as C4–C8 alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

The polymerization is preferably carried out continuously in a vertical fluidized bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

In one embodiment the reactor used in the present invention is capable of producing greater than 300 Kg/hr to about 80,000 Kg/hr or higher of polymer, preferably greater than 10,000 Kg/hr.

The polymerisation reaction is carried out in the presence of a metallocene catalyst.

Examples of metallocene catalysts according to the present invention are typically those bulky ligand transition metal compounds derivable from the formula:

$$[L]_m M[A]_n$$

where L is a bulky ligand; A is leaving group, M is a transition metal and m and n are such that the total ligand valency corresponds to the transition metal valency. Preferably the catalyst is four co-ordinate such that the compound is ionizable to a 1+ charge state.

The ligands L and A may be bridged to each other, and if two ligands L and/or A are present, they may be bridged The metallocene compound may be full-sandwich compounds having two or more ligands L, which may be cyclopentadienyl ligands or cyclopentadiene derived ligands, or half-sandwich compounds having one ligand L, which is a cyclopentadienyl ligand or derived ligand.

In one embodiment, at least one ligand L has a multiplicity of bonded atoms, preferably carbon atoms, that typically is a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, hydrogen or any other univalent anionic ligand. Non-limiting examples of metallocene catalysts and catalyst system are discussed in for example, U.S. Pat. Nos. 4,530,914, 5,124,418, 4,808, 561, 4,897,455, 5,278,264, 5,278,119, 5,304,614 all of which are herein fully incorporated by reference. Also, the disclosures of EP-A-0 129 368, EP-A-0 591 756, EP-A-0 520 732, EP-A-0 420 436, WO 91/04257 WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. Nos. 4,871,705, 4,937,299 and 5,324, 800, 5,017,714 and 5,120,867 all of which are fully incorporated herein by reference. These publications teach the structure of the metallocene catalysts and include alumoxane as the cocatalyst. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, all of which incorporated herein by reference.

Further, the metallocene catalyst component of the invention can be a monocyclopentadienyl heteroatom containing compound. This heteroatom is activated by either an alumoxane, an ionising activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. Nos. 5,064,802, 5,149,819, 5,243,001, 5,239,022, 5,276,208, 5,296,434, 5,321,106, 5,329,031 and 5,304,614, PCT publications WO 93/08221 and WO 93/08199 and EP-A-0 578 838 all of which are herein incorporated by reference.

The preferred transition metal component of the catalyst of the invention are those of Group 4, particularly, zirconium, titanium and hafnium. The transition metal may be in any oxidation state, preferably +2, +3 or +4 or a mixture thereof.

For the purposes of this patent specification the term "metallocene" is defined as containing one or more unsubstituted or substituted cyclopentadienyl or cyclopentadienyl moiety in combination with a transition metal. In one embodiment the metallocene catalyst component is represented by the general formula $(C_p)_m MR_n R'_p$ wherein at least one $C_p$ is an unsubstituted or, preferably, a substituted cyclopentadienyl ring, symmetrically or unsymmetrically substituted; M is a Group 4, 5 or 6 transition metal; R and R' are independently selected halogen, hydrocarbyl group, or hydrocarboxyl groups having 1–20 carbon atoms or combinations thereof; m=1–3, n=0–3, p=0–3, and the sum of m+n+p equals the oxidation state of M, preferably m=2, n=1 and p=1. The Cp can be substituted with a combination of substituents, which can be the same or different. Non limiting examples of substituents include hydrogen or a linear, branched or cyclic alkyl, alkenyl or aryl radical having from 1 to 20 carbon atoms In addition, the $C_p$ can be a substituted or unsubstituted ring system such as an indenyl moiety, a benzindenyl moitey, a fluorenyl moiety or the like.

In another embodiment the metallocene catalyst component is represented by the formulas:

$$(C_5R'_m)_p R''_s (C_5R'_m) MeQ_{3-x-p},$$

or $$R''_s (C_5R'_m)_2 MeQ'$$

wherein Me is a Group 4, 5, 6 transition metal, at least one $C_5 R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two ($C_5 R'_m$) rings, or bridging one ($C_5R'_m$) ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

The metallocene catalysts used in the present invention are preferably used together with a cocatalyst or activator. The terms "cocatalysts" and "activators" are used interchangeably and are defined to be any compound or component which can activate a bulky ligand transition metal compound or a metallocene, as defined above. It is within the scope of this invention to use alumoxane as an activator, and/or to also use ionising activators, neutral or ionic, or compounds such as tri (n-butyl) ammonium tetra (pentaflurophenyl) boron or trisperfluoro phenyl boron metalloid precursor, which ionise the neutral metallocene compound. Such ionising compounds may contain an active proton, or some other cation associated with but not coordinated or only loosely coordinated to the remaining ion of the ionising compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5;198,401, 5,066,741, 5,206,197 and 5,241,025, are all herein fully incorporated by reference. Combinations of activators are also contemplated by the invention, for example, alumoxane and ionising activators in combinations, see for example, WO 94/07928.

In another embodiment of the invention two or more metallocene catalyst components can be combined in the catalyst system of the invention. For example, those mixed catalysts described in U.S. Pat. No. 5,281,679 incorporated herein by reference. Also, in another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene divinyl benzene polyolefins or polymeric compounds or any other organic support material and the like, or mixtures thereof.

The catalyst system of the invention can be made in a variety of different ways. In one embodiment the catalyst is unsupported, see U.S. Pat. No. 5,317,036 and EP-A-0 593 083 incorporated herein by reference. In the preferred embodiment, the catalyst system of the invention is supported. Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706 and WO 95/10542 published Apr. 20, 1995, WO 95/07939 published Mar. 3, 1995, WO 94/26793 published Nov. 24, 1994 and WO 95/12622 published May 11, 1995.

According to a most preferred embodiment of the present invention, the metallocene catalyst composition comprises:

A) an inert support,
B) a Group 4–10 metal complex corresponding to the formula:

where M is a metal from one of Groups 4 to 10 of the Periodic Table of the Elements, which is in the +2 or +4 formal oxidation state,
Cp is a π-bonded anionic ligand group
Z is a divalent moiety bound to Cp and bound to M by either covalent or coordinate/covalent bonds, comprising boron or a member of Group 14 of the Periodic Table of the Elements, and also comprising nitrogen, phosphorus, sulfur or oxygen;
X is a neutral conjugated diene ligand group having up to 60 atoms, or a dianionic derivative thereof; and
C) an ionic cocatalyst capable of converting the metal complex into an active polymerisation catalyst.

Suitable metal complexes may be derivatives of any transition metal, preferably Group 4 metals that are in the +2, or +4 formal oxidation state. Preferred compounds include constrained geometry metal complexes containing one π-bonded anionic ligand group, which may be cyclic or noncyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by means of delocalized electrons present in a π bond.

Each atom in the delocalized π-bonded group may independently be substituted with a radical selected from the group consisting of hydrogen, halogen, hydrocarbyl, halohydrocarbyl, Group 15 or 16 heteroatom-containing radicals, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 heteroatom containing moiety. Included within the term "hydrocarbyl" are C1–C20 straight, branched and cyclic alkyl radicals, C6–C20 aromatic radicals, C7–C20 alkyl-substituted aromatic radicals, and C7–C20 aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include but are not limited to cyclopentadienyl, indenyl, fluorenyl, tetrahydroindenyl, tetrahydrofluorenyl, octahydrofluorenyl, pentadienyl, dimethylcyclohexadienyl, dimethyldihydroanthracenyl, dimethylhexahydroanthracenyl, demethyldecahydroanthracenyl groups, and boratabenzene groups, as well as C1-10 hydrocarbyl-substituted or C1-10 hydrocarbyl-substituted silyl substituted derivatives thereof. Preferred anionic delocalized π-bonded groups are cyclopentadienyl, tetramethylcyclopentadienyl, indenyl, 2,3-dimethylindenyl, fluorenyl, 2-methylindenyl, 2-methyl-4-phenylindenyl, tetrahydrofluorenyl, octahydrofluorenyl, tetrahydroindenyl, 2-methyl-s-indacenyl, 3-(N-pyrrolidinyl)indenyl, and cyclopenta(1)phenanthrenyl.

The boratabenzenes are anionic ligands which are boron containing analogues to benzene. They are previously known in the art having been described by G. Herberich, et al., in Organometallics, 1995, 14, 1, 471–480. Preferred boratabenzenes correspond to the formula:

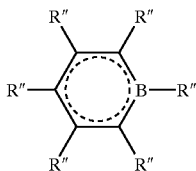

wherein each R" is independently selected from the group consisting of hydrocarbyl, silyl, or germyl radicals, each said R" having up to 20 non-hydrogen atoms, and being optionally substituted with a group containing a Group 15 or 16 element. In complexes involving divalent derivatives of such delocalized π-bonded groups one atom thereof is bonded by means of a covalent bond or a covalently bonded divalent group to another atom of the complex thereby forming a bridged system.

A preferred class of such Group 4 metal coordination complexes used according to the present invention correspond to the formula:

wherein Cp is an anionic, delocalized, π-bonded group that is bound to M, containing up to 50 nonhydrogen atoms;

M is a metal of Group 4 of the Periodic Table of the Elements in the +2 or +4 formal oxidation state;

X is a C4-30 conjugated diene represented by the formula:

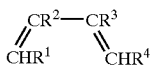

wherein R1, R2, R3, and R4 are each independently hydrogen, aromatic, substituted aromatic, fused aromatic, substituted fused aromatic, aliphatic, substituted aliphatic, heteroatom-containing aromatic, heteroatom-containing fused aromatic, or silyl radical;

Y is —O—, —S—, —NR—, or —PR—; and

Z is SiR2, CR2, SiR2SiR2, CR2CR2, CR=CR, CR2SiR2, or GeR2, BR2, B(NR2)2, BR2BR2, B(NR2)2BR(NR2)2, wherein R is in each occurrence independently selected from the group consisting of hydrogen, hydrocarbyl, silyl, germyl, cyano, halo and combinations thereof, said R having up to 20 non-hydrogen atoms, or adjacent R groups together form a divalent derivative (that is, a hydrocarbadiyl, siladiyl or germadiyl group) thereby forming a fused ring system.

A more preferred class of such Group 4 metal coordination complexes used according to the present invention correspond to the formula:

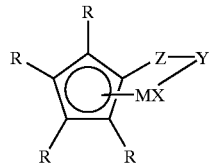

wherein:

M is titanium or zirconium in the +2 or +4 formal oxidation state;

X is a C5-30 conjugated diene represented by the formula:

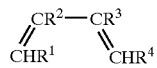

wherein R1, R2, R3, and R4 are each independently hydrogen, aromatic, substituted aromatic, fused aromatic, substituted fused aromatic, aliphatic, substituted aliphatic, heteroatom-containing aromatic, heteroatom-containing fused aromatic, or silyl radical;

Y is —O—, —S—, —NR*—, —PR*, and

Z is SiR*2, CR*2, SiR*2SiR*2, CR*2CR*2, CR*=CR*, CR*2SiR*2, or GeR*2,

R and R* are in each occurrence is independently selected from the group consisting of hydrogen, hydrocarbyl, silyl, germyl, cyano, halo and combinations thereof, said R having up to 20 non-hydrogen atoms, or adjacent R groups together form a divalent derivative (that is, a hydrocarbadiyl, siladiyl or germadiyl group) thereby forming a fused ring system.

Illustrative Group 4 metal complexes that may be employed in the practice of the present invention include:
(tert-butylamido)(tetramethyl-η5-cyclopentadienyldimethylsilanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl) dimethylsilanetitanium (II) 1,4-diphenyl-1,3-butadiene,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido)(2-methylindenyl)dimethylsilanetitanium (II) 1,3-pentadiene,
(tert-butylamido)(2-methyl-4-phenylindenyl) dimethylsilanetitanium (II) 1,4-diphenyl-1,3-butadiene,
(tert-butylamido)(tetramethyl-η5-cyclopentadienyl) dimethylsilanetitanium (IV) 1,3-butadiene,
(tert-butylamido)(tetramethyl-η5-cyclopentadienyl) dimethylsilanetitanium (II) 1,4-dibenzyl-1,3-butadiene,
(tert-butylamido)(tetramethyl-η5-cyclopentadienyl) dimethylsilanetitanium (II) 2,4-hexadiene,
(tert-butylamido)(tetramethyl-η5-cyclopentadienyl) dimethylsilanetitanium (II) 3-methyl 1,3-pentadiene,
(tert-butylamido)(tetramethylcyclopentadienyl) dimethylsilanetitanium 1,3-pentadiene, (tert-butylamido)(3-(N-pyrrolidinyl)inden-1-yl) dimethylsilanetitanium 1,3-pentadiene,
(tert-butylamido)(2-methyl-s-indacen-1-yl) dimethylsilanetitanium 1,3-pentadiene, and
(tert-butylamido)(3,4-cyclopenta(1)phenanthren-2-yl) dimethylsilanetitanium 1,4-diphenyl-1,3-butadiene.

Suitable activating cocatalysts for use herein include ion forming compounds (including the use of such compounds under oxidizing conditions), especially the use of ammonium-, phosphonium-, oxonium-, carbonium-, silylium-, sulfonium-, or ferrocenium-salts of compatible, noncoordinating anions, Lewis acids, such as C1-30 hydrocarbyl substituted Group 13 compounds, especially tri(hydrocarbyl)aluminum- or tri(hydrocarbyl)boron compounds and halogenated (including perhalogenated) derivatives thereof, having from 1 to 20 carbons in each hydrocarbyl or halogenated hydrocarbyl group, more especially perfluorinated tri(aryl)boron compounds, and most especially tris(pentafluorophenyl)borane, and combinations of the foregoing activating cocatalysts. The foregoing activating cocatalysts have been previously taught with respect to different metal complexes in the following references: U.S. Pat. Nos. 5,132,380, 5,153,157, 5,064,802, 5,321,106, 5,721,185, and 5,350,723.

Combinations of Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such Lewis acid mixtures with a polymeric or oligomeric alumoxane, and combinations of a single neutral Lewis acid, especially tris(pentafluorophenyl)borane with a polymeric or oligomeric alumoxane may also be used.

Suitable ionic compounds useful as cocatalysts in one embodiment of the present invention comprise a cation which is a Bronsted acid capable of donating a proton, and a compatible, noncoordinating anion, A-. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a Lewis base such as olefin monomer. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a coordination complex comprising one or more charge-bearing metal or metalloid atoms which anion is capable of balancing the charge of the active catalyst species (the metal cation) which may be formed when the two components are combined. Also, said anion should be sufficiently labile to be displaced by olefinic, diolefinic and acetylenically unsaturated compounds or other Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*—H)_d^+(A')^{d-}$$

wherein:
L* is a neutral Lewis base;
(L*—H)+ is a Bronsted acid;
A'd− is a noncoordinating, compatible anion having a charge of d−, and
d is an integer from 1 to 3.

More preferably A'd− corresponds to the formula: [M*Q4]−;

wherein:
M* is boron or aluminum in the +3 formal oxidation state; and
Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal-substituted hydrocarbyl, organometalloid substituted-hydrocarbyl, organometal-substituted hydocarbyloxy, halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable Q groups are disclosed in U.S. Pat. Nos. 5,296,433 and WO 98/27119, as well as elsewhere. In a more preferred embodiment, d is one, that is, the counter ion has a single negative charge and is A'-. Activating cocatalysts comprising boron which are particularly useful in the preparation of catalysts of this invention may be represented by the following general formula:

$$(L^*—H)^+(BQ_4)^-;$$

wherein:
L* is as previously defined;
B is boron in a formal oxidation state of 3; and
Q is a hydrocarbyl-, hydrocarbyloxy-, orgaonmetal-substituted hydrocarbyloxy, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, or dialkylaluminumoxyphenyl group, especially, a pentafluorophenyl group or diethylaluminumoxyphenyl group.

Illustrative, but not limiting, examples of boron compounds which may be used as an activating cocatalyst in the preparation of the improved catalysts of this invention are tri-substituted ammonium salts such as:
trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate, methylditetradecylammonium tetrakis(pentafluorophenyl) borate,
methyldioctadecylammonium tetrakis(pentafluorophenyl) borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis (pentafluorophenyl)borate,
trimethylammonium tetrakis(2,3,4,6-tetrafluorophenyl) borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-(2,4,6-trimethylanilinium) tetrakis-(2,3,4,6-tetrafluorophenyl)borate.

Dialkyl ammonium salts such as:
dioctadecylammonium tetrakis(pentafluorophenyl)borate,
ditetradecylammonium tetrakis(pentafluorophenyl)borate, and
dicyclohexyl ammonium tetrakis(pentafluorophenyl)borate.

Tri-substituted phosphonium salts such as:
triphenylphosphonium tetrakis(pentafluorophenyl)borate,
methyldioctadecylphosphonium tetrakis(pentafluorophenyl) borate, and
tri(2,6-dimethylphenyl)phosphonium tetrakis (pentafluorophenyl)borate.

Preferred are those cocatalysts which are referred to in this application as ammonium salts of boron containing anions, more particularly, triammonium salts, containing one or two C14–C20 alkyl groups on the ammonium cation and anions which are tetrakispentafluorophenylborate. Especially preferred ammonium salt cocatalysts are methyldi (octadecyl)ammonium tetrakis(pentafluorophenyl)borate and methyldi(tetradecyl)ammonium tetrakis (pentafluorophenyl)borate, or mixtures including the same Such mixtures include protonated ammonium cations derived from amines comprising two C14, C16 or C18 alkyl groups and one methyl group. Such amines are referred to herein as armeens and the cationic derivatives thereof are referred to as armeenium cations. They are available from Witco Corp., under the trade name Kemamine™ T9701, and from Akzo-Nobel under the trade name Armeen™ M2HT.

Another suitable ammonium salt, especially for use in heterogeneous catalyst compositions is formed upon reaction of a organometal or organometalloid compound, especially a tri(C1-6alkyl)aluminum compound with an ammonium salt of a hydroxyaryltris(fluoroaryl)borate compound. The resulting compound is an organometaloxyaryltris (fluoroaryl)borate compound which is generally insoluble in aliphatic liquids. Typically, such compounds are advantageously precipitated on support materials, such as silica, alumina or trialkylaluminum passivated silica, to form a supported cocatalyst mixture. Examples of suitable compounds include the reaction product of a tri(C1-6 alkyl) aluminum compound with the ammonium salt of hydroxyaryltris(fluoroaryl)borate. Exemplary fluoroaryl groups include perfluorophenyl, perfluoronaphthyl, and perfluorobiphenyl.

Particularly preferred hydroxyaryltris(fluoroaryl)-borates include the ammonium salts, especially the forgoing armeenium salts of:
(4-dimethylaluminumoxy-1-phenyl)tris(pentafluorophenyl) borate,
(4-dimethylaluminumoxy-3,5-di(trimethylsilyl)-1-phenyl) tris(pentafluorophenyl)borate,
(4-dimethylaluminumoxy-3,5-di(t-butyl)-1-phenyl)tris (pentafluorophenyl)borate,
(4-dimethylaluminumoxy-1-benzyl)tris(pentafluorophenyl) borate,
(4-dimethylaluminumoxy-3-methyl-1-phenyl)tris (pentafluorophenyl)borate,
(4-dimethylaluminumoxy-tetrafluoro-1-phenyl)tris (pentafluorophenyl)borate,
(5-dimethylaluminumoxy-2-naphthyl)tris (pentafluorophenyl)borate,
4-(4-dimethylaluminumoxy-1-phenyl)phenyltris (pentafluorophenyl)borate,
4-(2-(4-(dimethylaluminumoxyphenyl)propane-2-yl) phenyloxy)tris(pentafluorophenyl)borate,
(4-diethylaluminumoxy-1-phenyl)tris(pentafluorophenyl) borate,
(4-diethylaluminumoxy-3,5-di(trimethylsilyl)-1-phenyl)tris (pentafluorophenyl)borate,
(4-diethylaluminumoxy-3,5-di(t-butyl)-1-phenyl)tris (pentafluorophenyl)borate,
(4-diethylaluminumoxy-1-benzyl)tris(pentafluorophenyl) borate,
(4-diethylaluminumoxy-3-methyl-1-phenyl)tris (pentafluorophenyl)borate,
(4-diethylaluminumoxy-tetrafluoro-1-phenyl)tris (pentafluorophenyl)borate,
(5-diethylaluminumoxy-2-naphthyl)tris(pentafluorophenyl) borate,
4-(4-diethylaluminumoxy-1-phenyl)phenyltris (pentafluorophenyl)borate,
4-(2-(4-(diethylaluminumoxyphenyl)propane-2-yl) phenyloxy)tris(pentafluorophenyl)borate,
(4-diisopropylaluminumoxy-1-phenyl)tris (pentafluorophenyl)borate,
(4-diisopropylaluminumoxy-3,5-di(trimethylsilyl)-1-phenyl)tris(pentafluorophenyl)borate,
(4-diisopropylaluminumoxy-3,5-di(t-butyl)-1-phenyl)tris (pentafluorophenyl)borate,
(4-diisopropylaluminumoxy-1-benzyl)tris (pentafluorophenyl)borate,
(4-diisopropylaluminumoxy-3-methyl-1-phenyl)tris (pentafluorophenyl)borate,
(4-diisopropylaluminumoxy-tetrafluoro-1-phenyl)tris (pentafluorophenyl)borate,
(5-diisopropylaluminumoxy-2-naphthyl)tris (pentafluorophenyl)borate,
4-(4-diisopropylaluminumoxy-1-phenyl)phenyltris (pentafluorophenyl)borate, and
4-(2-(4-(diisopropylaluminumoxyphenyl)propane-2-yl) phenyloxy)tris(pentafluorophenyl)borate.

An especially preferred ammonium compound is methyldi(tetradecyl)ammonium (4-diethylaluminumoxy-1-phenyl)tris(pentafluorophenyl)borate, methyldi(hexadecyl) ammonium (4-diethylaluminumoxy-1-phenyl)tris (pentafluorophenyl)borate, methyldi(octadecyl)ammonium (4-diethylaluminumoxy-1-phenyl)tris(pentafluorophenyl) borate, and mixtures thereof. The foregoing complexes are disclosed in WO96/28480, which is equivalent to U.S. Ser. No. 08/610,647, filed Mar. 4, 1996, and in WO 98/27119 filed Dec. 18, 1996.

Another suitable activating cocatalyst comprises a salt of a cationic oxidizing agent and a noncoordinating, compatible anion represented by the formula:

$$(Ox^{e+})_d(A'^{d-})_e,$$

wherein

Ox$^{e+}$ is a cationic oxidizing agent having a charge of e+;
e is an integer from 1 to 3; and
A'd− and d are as previously defined.

Examples of cationic oxidizing agents include: ferrocenium, hydrocarbyl-substituted ferrocenium, Ag+, or Pb+2. Preferred embodiments of A'd− are those anions previously defined with respect to the Bronsted acid containing activating cocatalysts, especially tetrakis (pentafluorophenyl)borate.

Another suitable activating cocatalyst comprises a compound which is a salt of a carbenium ion and a noncoordinating, compatible anion represented by the formula:

$$©^+A'^-$$

wherein:

©+ is a C1-20 carbenium ion; and
A'− is a noncoordinating, compatible anion having a charge of −1. A preferred carbenium ion is the trityl cation, i.e. triphenylmethylium.

A further suitable activating cocatalyst comprises a compound which is a salt of a silylium ion and a noncoordinating, compatible anion represented by the formula:

$$R_3SiX'_nA'^-$$

wherein:

R is C1-10 hydrocarbyl;
X' is a Lewis base;
n is 0, 1 or 2, and
A'− is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in J. Chem Soc. Chem. Comm., 1993, 383–384, as well as Lambert, J. B., et al., Organometallics, 1994, 13, 2430–2443. The use of the above silylium salts as activating cocatalysts for addition polymerization catalysts is claimed in U.S. Pat. No. 5,625,087.

Certain complexes of alcohols, mercaptans, silanols, and oximes with tris(pentafluorophenyl)borane are also effective cocatalysts and may be used according to the present invention. Such cocatalysts are disclosed in U.S. Pat. No. 5,296,433.

In one preferred embodiment, the cocatalyst will comprise a compound corresponding to the formula:

$$(A^{+a})_b(EJ_j)^{-cd},$$

wherein:

A is a cation of charge +a,
E is an anion group of from 1 to 30 atoms, not counting hydrogen atoms, further containing two or more Lewis base sites;
J independently each occurrence is a Lewis acid coordinated to at least one Lewis base site of E, and optionally two of more such J groups may be joined together in a moiety having multiple Lewis acidic functionality,
j is a number from 2 to 12 and
a, b, c, and d are integers from 1 to 3, with the proviso that a×b is equal to
c×d. Such compounds are disclosed and claimed in U.S. Ser. No. 09/251664, filed Feb. 17, 1999.

Examples of most highly preferred cocatalysts of this class are substituted imidizolide anions having the following structures:

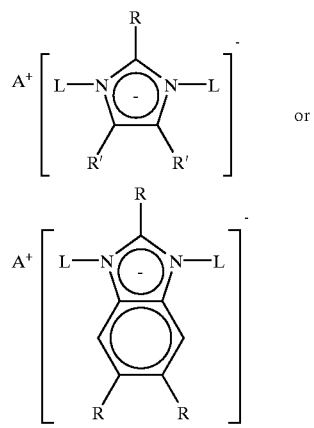

wherein:

A+ is as previously defined, and preferably is a trihydrocarbyl ammonium cation, containing one or two C10-40 alkyl groups, especially, methyldioctadecylammonium cation,
R' is in each occurrence is independently selected from the group consisting of hydrogen, hydrocarbyl, silyl, germyl, cyano, halo and combinations thereof, each said R' having up to 30 non-hydrogen atoms (especially methyl or a C10 or higher hydrocarbyl group), and
L is a trisfluoroarylboron or trisfluoroarylaluminum compound containing three C6-20 fluoroaryl-groups, especially pentafluorophenyl groups.

The molar ratio of catalyst/cocatalyst employed preferably ranges from 1:10 to 10:1, more preferably from 1:5 to 5:1, most preferably from 1:1.5 to 1.5:1. Preferably, the catalyst and activating cocatalyst are present on the support in an amount of from 5 to 200, more preferably from 10 to 75 micromoles per gram of support.

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W. R. Grace & Co.) under the designations SD 3216.30, Davison Syloid 245, Davison 948 and Davison 952, and from Crossfield under the designation ES70, and from Degussa AG under the designation Aerosil 812; and aluminas available from Akzo Chemicals Inc. under the designation Ketzen Grade B.

Supports suitable for the present invention preferably have a surface area as determined by nitrogen porosimetry using the B.E.T. method from 10 to about 1000 m2/g, and preferably from about 100 to 600 m2/g. The pore volume of the support, as determined by nitrogen adsorption, advantageously is from about 0.1 to 3 cm3/g, preferably from about 0.2 to 2 cm3/g. The average particle size depends upon the process employed, but typically is from 0.5 to 500 μm, preferably from 1 to 100 μm.

Both silica and alumina are known to inherently possess small quantities of hydroxyl functionality. When used as a support herein, these materials are preferably subjected to a heat treatment and/or chemical treatment to reduce the hydroxyl content thereof. Typical heat treatments are carried out at a temperature from 30° C. to 1000° C. (preferably 250° C. to 800° C. for 4 hours or greater) for a duration of 10 minutes to 50 hours in an inert atmosphere or air or under reduced pressure, i.e., at a pressure of less than 200 Torr. When calcination occurs under reduced pressure, preferred temperatures are from 100 to 800° C. Residual hydroxyl groups are then removed via chemical treatment. Typical chemical treatments include contacting with Lewis acid alkylating agents such as trihydrocarbyl aluminum compounds, trihydrocarbylchlorosilane compounds, trihydrocarbylalkoxysilane compounds or similar agents.

The support may be functionalized with a silane or chlorosilane functionalizing agent to attach thereto pendant silane —(Si—R)=, or chlorosilane —(Si—Cl)= functionality, wherein R is a C1-10 hydrocarbyl group. Suitable functionalizing agents are compounds that react with surface hydroxyl groups of the support or react with the silicon or aluminum of the matrix. Examples of suitable functionalizing agents include phenylsilane, hexamethyldisilazane diphenylsilane, methylphenylsilane, dimethylsilane, diethylsilane, dichlorosilane, and dichlorodimethylsilane. Techniques for forming such functionalized silica or alumina compounds were previously disclosed in U.S. Pat. Nos. 3,687,920 and 3,879,368.

In the alternative, the functionalizing agent may be an aluminum component selected from an alumoxane or an aluminum compound of the formula

$$AlR1_{x'}R2_{y'},$$

wherein:

$R^1$ independently each occurrence is hydride or $R^\#$, $R^2$ is hydride, $R^\#$ or $OR^\#$, $R^\#$ is in each occurrence is independently selected from the group consisting of hydrogen, hydrocarbyl, silyl, said $R^\#$ having up to 20 non-hydrogen atoms, x' is 2 or 3, y' is 0 or 1 and the sum of x' and y' is 3.

Examples of suitable R1 and R2 groups include methyl, methoxy, ethyl, ethoxy, propyl (all isomers), propoxy (all isomers), butyl (all isomers), butoxy (all isomers), phenyl, phenoxy, benzyl, and benzyloxy. Preferably, the aluminum component is selected from the group consisting of tri(C1-4 hydrocarbyl)aluminum compounds. Most preferred aluminum components are trimethylaluminum, triethylaluminum, tri-isobutylaluminum, and mixtures thereof.

Such treatment typically occurs by:

(a) adding to the calcined silica sufficient solvent to achieve a slurry;

(b) adding to the slurry the agent in an amount of 0.1 to 5 mmol agent per gram of calcined silica, preferably 1 to 2.5 mmol agent per gram of calcined silica to form a treated support;

(c) washing the treated support to remove unreacted agent to form a washed support, and (d) drying the washed support by heating and/or by subjecting to reduced pressure.

In one embodiment of the process of the invention, olefin(s), preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 5,283,278 and 4,921,825 and EP-B-0279 863 all of which are herein fully incorporated by reference.

In another embodiment of the invention, the supported catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the supported catalyst system of the invention includes a polyolefin wax or tackifier or the like.

The following non limiting examples illustrate the present invention.

EXAMPLES

Preparation of TEA-Treated Silica

A 450 Kg sample of 948 silica (available from Grace-Davison) was fluidized in nitrogen and heated at 250° C. for 5 hours. A 63.5 Kg sample was added to a 750 L vessel under nitrogen, and 150 L dry, oxygen free hexane was added to form a slurry. STADIS was added to a concentration of 150 ppmw/Kg silica. Next, 61.6 Kg of a 1.21 M solution of triethylaluminum in hexane was added over 30 minutes, with cooling to maintain the temperature of the slurry at 30+/−2° C. On completion of addition, the mixture was stirred for a further 30 minutes, and the free solvent was removed by filtration. A further 217 L of hexane was introduced, the mixture was stirred for 10 minutes, and the solvent was again withdrawn by filtration. This process was repeated until the residual aluminum in the wash solvent was less than 0.5 mmol Al/L solvent (approximately 4 washes total). The treated silica was reslurried in 217 L hexane, STADIS was introduced at a concentration of 150 ppmw/Kg treated silica, and the slurry was transferred to a 800 L horizontal rotary drier. The treated silica was dried under vacuum (~10 torr) at maximum temperature of 60° C. until the residual solvent was less than 1% by weight.

Preparation of the Catalyst

In a 180 L Pfaudler reactor under nitrogen was added 25.9 Kg of a 10.0 wt. % solution of bis(hydrogenated tallow alkyl)methyl ammonium tris(pentafluorophenyl)(4-hydroxyphenyl)borate, prepared as described in PCT98/27 119. To the stirred solution was added 25.8 Kg dry, oxygen free toluene to bring the solution concentration to 0.04 M. After 10 minutes, 2.1 Kg of a toluene solution of triethylaluminum (1.01 M) was added. The solution was mixed for 30 minutes while maintaining a temperature of 20+/−2° C.

The solution was next introduced into the rotary drier via atomising nozzles with rapid agitation of the treated silica. On completion of addition, the impregnated material was allowed to mix for 30 minutes. At this time the solvent was removed under vacuum (~10 torr) at a temperature up to a maximum of 40° C. The solids were dried to a maximum residual solvent content of ≦0.2% by weight.

With constant mixing of the modified silica, 9.85 Kg of a 8.32% by weight solution of (t-butylamido)(tetramethyl-η5-cyclopentadienyl)dimethylsilanetitanium (II)η4-3-methyl-1,3-pentadiene (prepared as described in U.S. Pat. No. 5,470,993, example 17) in heptane was introduced into the rotary drier via atomizing nozzels. On completion of addition, the dry solid was agitated for a further 1 hour. At this time, the solids were dried to a residual solvent content of ≦0.2% by weight. A total of 74.7 Kg of finished catalyst was recovered.

Example 1

The process is carried out in a fluidized bed gas phase polymerization reactor consisting of a vertical cylinder of diameter 0.74 m and height 7 m and surmounted by a velocity reduction chamber. In its lower part, the reactor is equipped with a fluidization grid and an external line for recycling gas, connecting the top of the velocity reduction chamber to the lower part of the reactor, situated under the fluidization grid. The gas recycling line is equipped with a compressor and with a heat transfer means. Opening into the gas recycling line there are, in particular, the feed lines for ethylene, 1-hexene, hydrogen and nitrogen, which represent the main constituents of the gas reaction mixture passing through the fluidized bed.

Above the fluidization grid the reactor contains a fluidized bed consisting of a linear low density polyethylene powder. The gas reaction mixture, which contains ethylene, 1-hexene, hydrogen and nitrogen passes through the fluidized bed at a pressure of 2 MPa, at 75° C. and with an upward fluidization velocity of 0.36 m/s.

STADIS 425 is used as process aid additive. It is diluted in pentane in a ratio of 15 g of STADIS 425 per liter of pentane.

The fluidized bed reactor is pre-loaded by introducing directly STADIS 425 in the bed in an amount equal to 50 ppm of STADIS 425 versus the total bed weight, whose initial height is 3 m.

The catalyst (prepared as above) introduction into the reactor starts just after the above pre-load procedure.

Simultaneously, STADIS 425 (same dilution as above) is directly introduced into the fluidized bed reactor in an amount equal to 50 ppm of STADIS 425 versus the total olefin introduction.

The polymerization starts smoothly with an ethylene pressure of 6 bars. Bed height is then increased to 5 m. At this stage, a sample S1 of polymer is taken from the reactor. Ethylene pressure is then increased in parallel with production rate to 8 bars then 10 bars and beyond.

Under these conditions a linear low density polyethylene with a density of 0.918, a melt index of 1.2 g/10 minutes under a 2.16-kg load at 190° C. is manufactured successfully at an output of 110 kg/h with a catalyst productivity of 3000 g of polymer per g of catalyst without any perturbations.

At the end of the run, the reactor was opened/inspected and revealed no indication of fouling, i.e. the reactor wall (cylindrical section as well as bulb) was perfectly clean.

Comparative Example 1

The process is carried out in exactly the same reactor as in example 1 under the same operating conditions as those prevailing in example 1 (gas phase composition, pressure, temperature, catalyst, . . . ), except that no process aid additive is used.

The polymerisation starts again with an ethylene pressure of 6 bars. Bed height is then increased to 5m. At this stage, a sample SC1 of polymer is taken from the reactor. Ethylene pressure is then increased in parallel with production rate to 8 bars.

Under these conditions a linear low density polyethylene with a density of 0.918, a melt index of 1.2 g/10 minutes under a 2.16-kg load at 190° C. is manufactured at an output of 100 kg/h with a catalyst productivity limited to 2000 g of polymer per g of catalyst.

The reaction operation is characterised by significant perturbations, like temperature fluctuations in the bed and production of polymer agglomerates.

At the end of the run, the reactor was opened/inspected and revealed clear indication of fouling, i.e. the reactor wall is fouled with polymer powder, a lot of fines are accumulated in the bulb, and some large agglomerates are found on the grid.

One of the main advantages highlighted in the course of the use of the process aid additive according to the present invention lies in the possibility to increase the pressure of ethylene to levels never reached without use of process aid additive and without encountering process problems. This means the possibility to reach higher catalyst productivities than in the past as reflected by the above examples.

In the course of the analysis of results obtained after having successfully repeated the above examples, the Applicants also surprisingly found that their invention process shows a much lower hydrogen response when the process aid additive is used. This fact can directly be translated into a significant advantage for the process of the present invention, i.e. that it is now possible to operate the reactor at higher hydrogen concentrations, thereby making reactor control easier and more reliable; indeed, when repeating the above examples, the Applicants realised that they could operate the process invention at higher hydrogen concentration and corresponding reliable control process. This was reflected e.g. by the instantaneous melt index values of the LLDPE for the above example 1 and comparative example 1; in example 1 these instantaneous values were fluctuating around the 1.2 value between at 1.05 and 1.35 melt index values; in comparative example 1, these instantaneous values were fluctuating around the 1.2 value at 0.5 and 1.9 melt index values. This represents another showing of the benefits brought by the use of the process according to the present invention.

Analysis of Polymer Powder Samples S1 and SC1

The compressibility property of the polymer samples has been measured with a typical "Johanson Indicizer™ System" apparatus. More information on said apparatus and its principle can be found in "Bulk Solids Handling" Vol. 12, No. 2, May 1992, pages 237–240 and in "Part E: Journal of Process Mechanical Engineering", 1996, pages 1 to 8, the content of which is hereby incorporated by reference.

The compressibility (%) value is calculated from the following equation $$C=(BDI-FDI)*100/BDI$$

wherein:

C is the Compressibility (%)

BDI is the Bin Density Index which represents the bulk density inside a typical bin FDI is the Feed Density Index which represents the bulk density at typical hopper outlet (silo of 3 m diameter; cone aperture of 30 cm; cone ½ angle of 20°)

All the measurements have been done at a temperature of 55° C. in order to better reflect the operating process conditions.

The compressibility values of the polymer powder samples are:

C=8.08 for S1 which is indicative of a very good flowability

C=13.09 for SC1 which is indicative of a poor flowability.

What is claimed is:

1. A process for improving the flowability of ethylene (co)polymer and/or the fluidization characteristics of ethylene (co)polymer during the continuous gas-phase (co-)polymerization of ethylene comprising (co-)polymerizing ethylene in a polymerization zone of a fluidized bed reactor using a metallocene catalyst and a cocatalyst in the presence of a process aid additive, wherein the process aid additive is not added in admixture with the catalyst or the cocatalyst and wherein the process aid additive comprises at least one of the components selected from:

(1) a polysulfone copolymer,
   (2) a polymeric polyamine, or
   (3) an oil-soluble sulfonic acid.

2. The process of claim 1, wherein the process aid additive is directly added into the polymerization zone.

3. The process of claim 2, wherein the process aid additive is directly added into the fluidized bed polymerization reaction zone.

4. The process of claim 1, wherein the process aid additive is added continuously.

5. The process of claim 1, wherein the process aid additive comprises at least two components selected from components (1), (2) and (3).

6. The process of claim 5, wherein the process aid additive comprises a mixture of components (1), (2) and (3).

7. The process of claim 6, wherein the process aid additive comprises about 5–70 weight percent polysulfone copolymer, 5–70 weight percent polymeric polyamine, and 5–70 weight percent oil-soluble sulfonic acid.

8. The process of claim 1, wherein the process aid additive comprises from about 0.3 to about 70 parts by weight per million parts by weight of total ethylene or total ethylene and comonomer introduced into the reactor.

9. The process of claim 1, wherein the reactor is pre-loaded with the process aid additive before the metallocene catalyst is introduced into the reactor.

10. The process of claim 9, wherein the pre-load is performed solely on seed bed polymer.

11. The process of claim 1, wherein ethylene and a comonomer are polymerized and the comonomer is selected from but-1-ene, hex-1-ene or 4-methylpent-1-ene.

* * * * *